(12) United States Patent
Tanaka et al.

(10) Patent No.: US 9,645,481 B2
(45) Date of Patent: May 9, 2017

(54) LIGHT SOURCE APPARATUS AND PROJECTION DISPLAY APPARATUS

(71) Applicant: Panasonic Intellectual Property Management Co., Ltd., Osaka (JP)

(72) Inventors: Takaaki Tanaka, Osaka (JP); Michihiro Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/006,223

(22) Filed: Jan. 26, 2016

(65) Prior Publication Data

US 2016/0238923 A1   Aug. 18, 2016

(30) Foreign Application Priority Data

Feb. 12, 2015  (JP) ................................ 2015-024893
Jan. 8, 2016  (JP) ................................ 2016-002205

(51) Int. Cl.

| G03B 21/14 | (2006.01) |
| G03B 21/20 | (2006.01) |
| G02B 27/14 | (2006.01) |
| G03B 21/00 | (2006.01) |
| H04N 9/31 | (2006.01) |

(Continued)

(52) U.S. Cl.
CPC ............. *G03B 21/208* (2013.01); *F21V 9/08* (2013.01); *G02B 26/007* (2013.01); *G02B 27/141* (2013.01); *G03B 21/008* (2013.01); *G03B 21/204* (2013.01); *G03B 21/2073* (2013.01); *H04N 9/3114* (2013.01); *H04N 9/3158* (2013.01); *H04N 9/3167* (2013.01)

(58) Field of Classification Search
CPC ...... G03B 21/204; G03B 21/2033; F21V 9/08
See application file for complete search history.

(56) References Cited

U.S. PATENT DOCUMENTS 8,733,940 B2 * 5/2014 Tanaka .................. G03B 21/28
                                                      353/20
9,388,965 B2 * 7/2016 Miyoshi ................. F21V 13/08
(Continued)

FOREIGN PATENT DOCUMENTS

JP   2012-108486   6/2012
JP   2013-250494   12/2013

*Primary Examiner* — William C Dowling
(74) *Attorney, Agent, or Firm* — McDermott Will & Emery LLP

(57) ABSTRACT

The light source apparatus of the present disclosure includes a solid-state light source, a dichroic mirror for reflecting blue excitation light emitted from the solid-state light source, a phase difference plate for receiving the excitation light reflected on the dichroic mirror, a fluorescent plate having a fluorescent region irradiated with the excitation light, which is reflected on the dichroic mirror and transmitted through the phase difference plate, to emit fluorescent light and a reflection region for reflecting the excitation light, and a plurality of condenser lenses that are disposed between the phase difference plate and the fluorescent plate and condense the excitation light and the fluorescent light. Among the plurality of condenser lenses, the condenser lens closest to the fluorescent plate is made of a glass material having a linear expansion coefficient of $32.5 \times 10^{-7}$ or less.

20 Claims, 10 Drawing Sheets

(51) Int. Cl.
*G02B 26/00* (2006.01)
*F21V 9/08* (2006.01)

(56) References Cited

U.S. PATENT DOCUMENTS

| | | | | |
|---|---|---|---|---|
| 9,500,937 B2 * | 11/2016 | Kato | ............... | G03B 21/204 |
| 2012/0127435 A1 | 5/2012 | Kitano et al. | | |
| 2014/0354892 A1 * | 12/2014 | Kitano | ............ | H04N 9/3111 |
| | | | | 348/744 |
| 2015/0098065 A1 * | 4/2015 | Tanaka | ............ | G03B 21/2013 |
| | | | | 353/84 |
| 2016/0091782 A1 * | 3/2016 | Hashizume | ........ | G03B 21/208 |
| | | | | 353/84 |

* cited by examiner 3B-3B cross section

FIG. 4

| Glass material usable for a lens | Typical glass material | Low thermal expansion glass material | | |
|---|---|---|---|---|
| | Optical glass 102 type (crown glass, flint grass) | Pyrex (Trademark) | Tempax (Trademark) | Synthetic quartz glass |
| Linear expansion coefficient (100°C~300°C) | $60 \times 10^{-7} \sim 175 \times 10^{-7}$ | $32.5 \times 10^{-7}$ | $32.5 \times 10^{-7}$ | $5.0 \times 10^{-7} \sim 5.9 \times 10^{-7}$ |

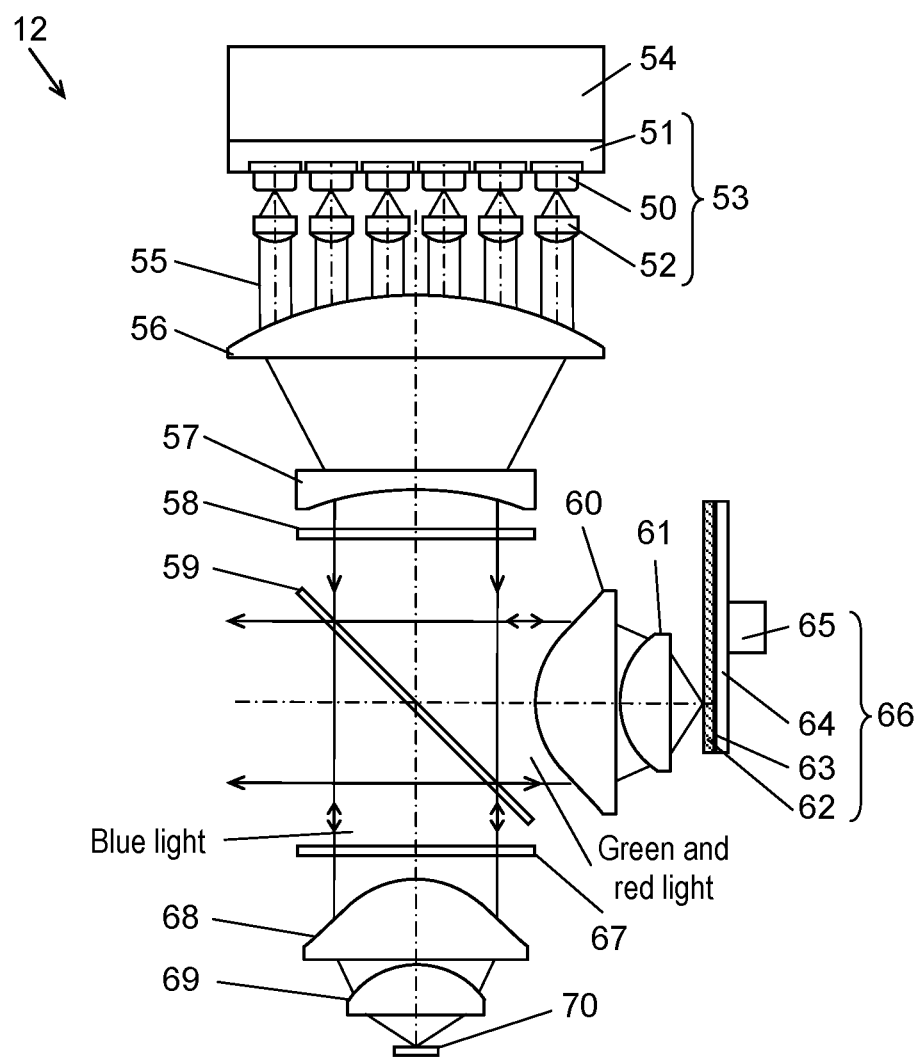

8B-8B cross section

LIGHT SOURCE APPARATUS AND PROJECTION DISPLAY APPARATUS

BACKGROUND

1. Technical Field

The disclosure relates to a projection display apparatus for irradiating images formed on a digital micro mirror device (DMD) or miniaturized light bulbs with illumination light to magnify and project them on a screen by using a projection lens, and a light source apparatus used in the projection display apparatus.

2. Description of the Related Art

As a light source of a projection display apparatus using a mirror deflection type DMD or light bulbs in a liquid crystal panel, discharge lamps are widely used. The discharge lamps disadvantageously have a short life and low reliability. To solve the problem, in recent years, there have been disclosed a number of projection display apparatuses using a solid-state light source such as a semiconductor laser or a light-emitting diode, which has a long life, as a light source. Among these disclosures, there is disclosed a small sized light source apparatus capable of condensing light emitted from a solid-state light source efficiently by utilizing polarization properties of the light from the solid-state light source. (Patent Literature 1) (Patent Literature 2)

CITATION LIST

Patent Literature

PTL 1: Unexamined Japanese Patent Publication No. 2012-108486
PTL 1: Unexamined Japanese Patent Publication No. 2013-250494

SUMMARY

The disclosure proposes a small sized light source apparatus capable of increasing an output of blue light drastically and having high brightness.

The light source apparatus of the present disclosure includes a solid-state light source, a dichroic mirror for reflecting blue excitation light emitted from the solid-state light source, a phase difference plate for receiving the excitation light reflected on the dichroic mirror, a fluorescent plate having a fluorescent region irradiated with the excitation light, which is reflected on the dichroic mirror and transmitted through the phase difference plate, to emit fluorescent light and a reflection region for reflecting the excitation light, and a plurality of condenser lenses that are disposed between the phase difference plate and the fluorescent plate and condense the excitation light and the fluorescent light. Among the plurality of condenser lenses, the condenser lens closest to the fluorescent plate is made of a glass material having a linear expansion coefficient of $32.5 \times 10^{-7}$ or less.

Further, the light source apparatus of the present disclosure includes: a solid-state light source; a dichroic mirror for dividing light from the solid-state light source and synthesizing blue light, green light, and red light; a fluorescent-light side condenser lens for condensing one of the light divided by the dichroic mirror; a fluorescent plate that is excited by the light condensed by the fluorescent-light side condenser lens to emit fluorescent light; a phase difference plate for converting the other of the light divided by the dichroic mirror into circularly-polarized light; a reflection-plate side condenser lens for condensing the circularly-polarized light converted by the phase difference plate; and a reflection plate for reflecting the light from the reflection-plate side condenser lens. The reflection-plate side condenser lens close to the reflection plate is made of a glass material having a linear expansion coefficient of $32.5 \times 10^{-7}$ or less.

According to the present disclosure, at least a condenser lens close to the fluorescent plate or the reflection plate is made of a low thermal expansion material, thereby improving conversion efficiency of polarized light and increasing an output of blue light drastically. Therefore, a small-sized light source apparatus with high brightness can be obtained. Further, by using the light source apparatus, a small-sized projection display apparatus with a long life and high brightness is achieved.

BRIEF DESCRIPTION OF DRAWINGS

FIG. 4 is a table indicating linear expansion coefficients of glass materials for a lens.

FIG. 7 is a schematic diagram of a light source apparatus in a second exemplary embodiment.

DETAILED DESCRIPTION OF THE PREFERRED EMBODIMENTS

Hereinafter, embodiments for carrying out the present disclosure will be described with reference to the drawings.

First Exemplary Embodiment

Figure 1:
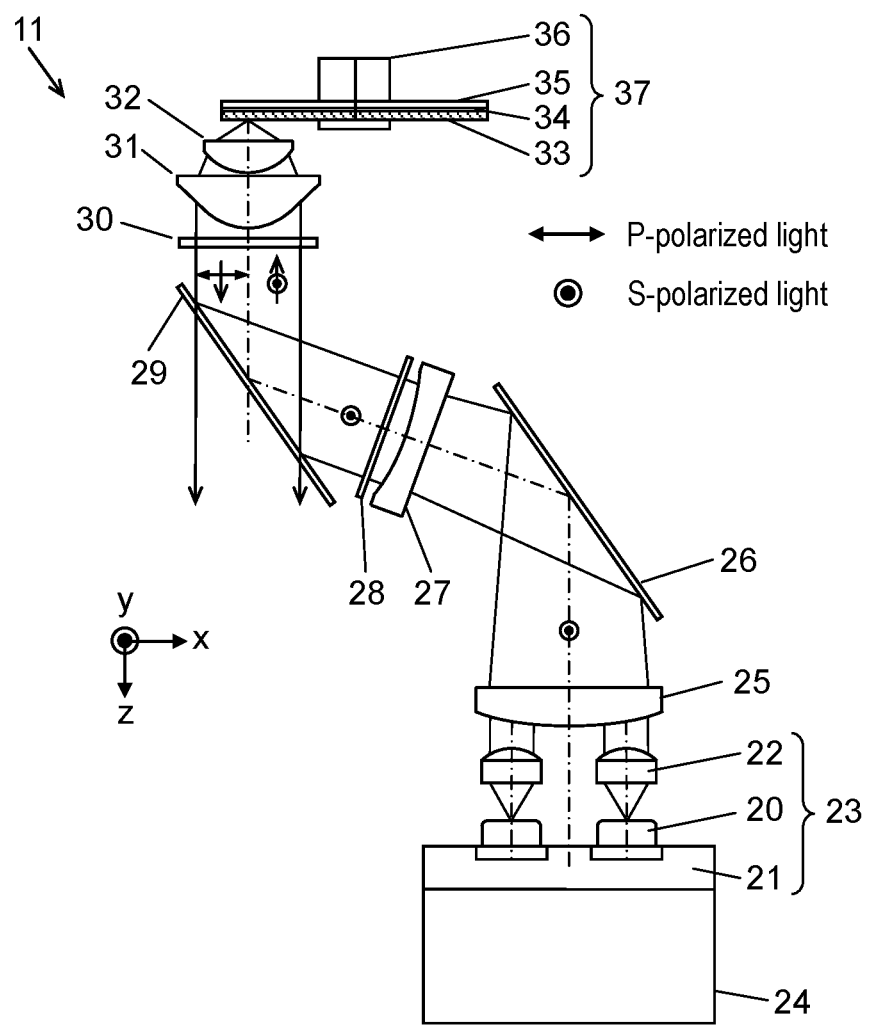
FIG. 1 is a schematic diagram of a light source apparatus in a first exemplary embodiment.

FIG. 1 is a schematic diagram of light source apparatus 11 showing an embodiment of the present disclosure.

Solid-state light source unit 23 has eight units (2×4) of semiconductor laser 20 and collimating lens 22 that are provided on heat dissipating plate 21 and arranged two-dimensionally at predetermined intervals in a square manner. To cool solid-state light source unit 23, heat sink 24 is provided. Semiconductor laser 20 emits blue light having a wavelength of 440 nm to 445 nm and outputs linearly polarized light. Each semiconductor laser is arranged such that the polarized light outputted from semiconductor laser 20 is S-polarized light with respect to an incident surface of dichroic mirror 29. Note that, FIG. 1 illustrates a state of each light beam emitted from solid-state light source unit 23 and a polarization direction of the light entering or reflected on dichroic mirror 29.

The light emitted from the plurality of semiconductor lasers 20 is condensed by the corresponding collimating lenses 22 respectively and converted into parallel light beams. Optical paths of the light beams are deflected by convex lens 25, reflecting mirror 26, and concave lens 27 to form an approximately parallel light beam whose diameter is reduced. Then, the light beam enters diffuser plate 28. Diffuser plate 28 is made of glass and its front surface is finely roughed to diffuse light. Supposed that a diffusion angle is defined by a half angular width at which the intensity of the diffused light decreases to 50% of the maximum intensity, the diffusion angle of the diffused light is as high as about 3 degrees. Thus, the diffused light maintains its polarization property. The light outputted from diffuser plate 28 enters dichroic mirror 29 at an incident angle of 55 degrees.

Figure 2:
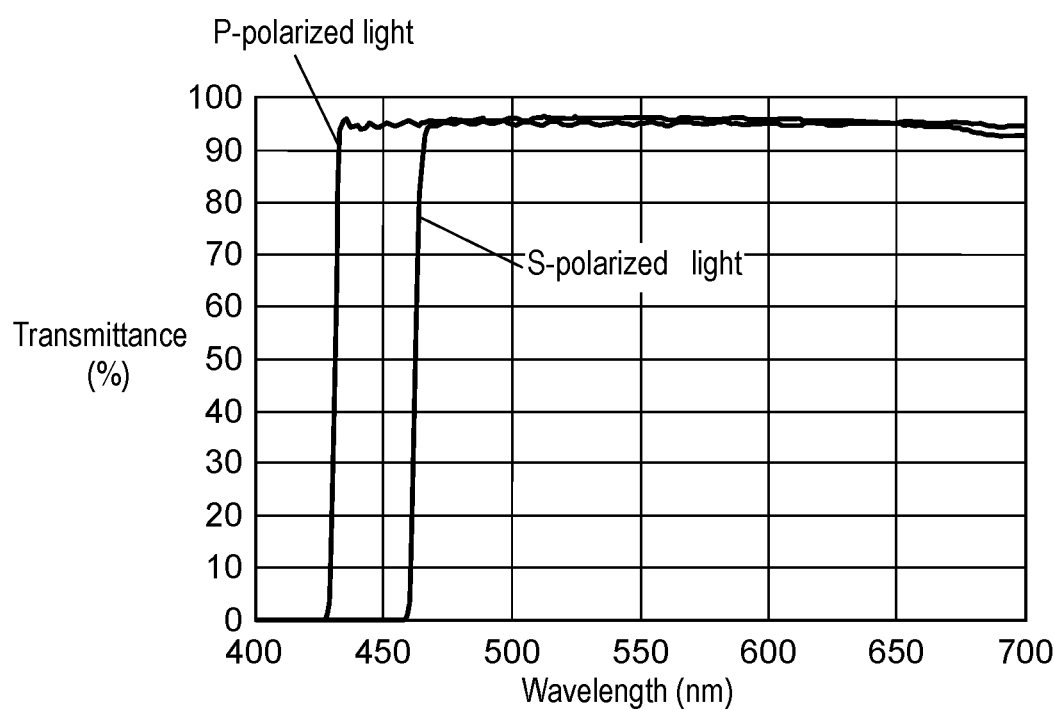
FIG. 2 is a diagram showing spectral characteristics of a dichroic mirror.

FIG. 2 shows spectral characteristics of dichroic mirror 29, which show transmittance versus wavelength characteristics. The spectral characteristics show that S-polarized light of semiconductor laser light with a wavelength of 440 nm to 455 nm is reflected with high reflectance, i.e., 95% or more, and P-polarized light is transmitted at a transmittance of 92% or more. Furthermore, P-polarized light and S-polarized light of green light and red light are transmitted at a high transmittance of 92% or more. Supposed that a difference in wavelength between P-polarized light having a transmittance of 50% and S-polarized light having a transmittance of 50% is defined as a wavelength separation width, the wavelength separation width is 31 nm In a dichroic mirror with an incident angle of 45 degrees, a wavelength separation width between P-polarized light and S-polarized light is typically less than or equal to about 22 nm. The dichroic mirror with an incident angle of 55 degrees has a wider wavelength separation width than the dichroic mirror with an incident angle of 45 degrees. Accordingly, in the dichroic mirror with an incident angle of 55 degrees, S-polarized light is reflected with high reflectance and P-polarized light is transmitted with high transmittance, even if the light emitted from semiconductor laser is varied in wavelength.

As shown in FIG. 1, the blue light of S-polarized light reflected on dichroic mirror 29 enters quarter-wave plate 30 serving as a phase difference plate. Quarter-wave plate 30 is a phase difference plate that causes a phase difference to be ¼ wavelength in the vicinity of an emission wavelength of semiconductor laser 20. Quarter-wave plate 30 is made of crystal, which has high heat resistance and durability. The incident light of S-polarized light is converted into circularly-polarized light in quarter-wave plate 30. The light that has passed through quarter-wave plate 30 is condensed to fluorescent plate 37 by first condenser lens 31 and second condenser lens 32.

Supposed that a spot diameter is defined as a diameter when light intensity is decrease to 13.5% of the peak intensity, the light condensed by first condenser lens 31 and second condenser lens 32 is superimposed to spot light with a spot diameter of 1 mm to 2 mm, and enters fluorescent plate 37. Diffuser plate 28 diffuses light such that the spot light has a desirable diameter.

Fluorescent plate 37 is a circular substrate capable of controlling its rotation. Fluorescent plate 37 includes aluminum substrate 35 on which reflection film 34 and phosphor layer 33 are formed, and motor 36 provided in its center portion. Aluminum substrate 35 of fluorescent plate 37, which is made of aluminum having high thermal conductivity, is rotated to prevent temperature rise in phosphor layer 33 due to excitation light, thereby keeping fluorescence conversion efficiency stably.

Figure 3A:
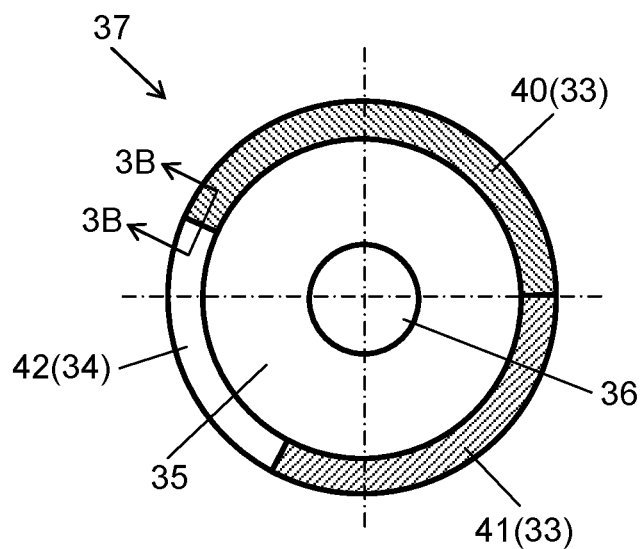
FIG. 3A is a schematic diagram of a fluorescent plate in the first exemplary embodiment and FIG. 3B is a sectional view taken along 3B-3B shown in FIG. 3A.

FIG. 3A shows a reflection region and a fluorescent region of fluorescent plate 37. Circular fluorescent plate 37 is divided into three segments, of which two segments are a fluorescent region on which green phosphor 40 is applied and a fluorescent region on which red phosphor 41 is applied. The other segment is reflection region 42 on which reflection film 34 is formed. As green phosphor 40 for fluorescent emission of light including a green component, $Y_3Al_5O_{12}:Ce^{3+}$ is used. As red phosphor 41 for fluorescent emission of light including a red component, $CaAlSiN_3:Eu^{2+}$ is used. As reflection film 34 of reflection region 42, a metal film made of aluminum is used.

Figure 3B:
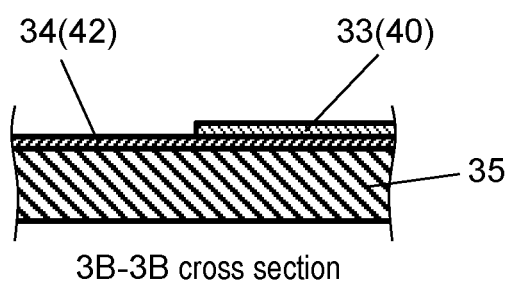

FIG. 3B shows a sectional view taken along 3B-3B in FIG. 3A to explain the fluorescent region and the reflection region in a thickness direction. Reflection film 34 is formed on aluminum substrate 35. Phosphor layer 33 having a thickness of approximately 0.1 mm to 0.2 mm is formed on reflection film 34 by printing or coating. The light that has entered phosphor layer 33 of the fluorescent region causes photoluminescence and emits green light and red light from fluorescent plate 37. Further, the light directed to a reflection film 34 side of the fluorescent region is reflected on reflection film 34 and emitted from fluorescent plate 37. On the other hand, the circularly-polarized blue light has entered reflection film 34 of reflection region 42, is changed to reverse-rotated circularly-polarized light and emitted from fluorescent plate 37. The green fluorescent light and the red fluorescent light emitted from fluorescent plate 37, which are non-polarized light, are condensed by first condenser lens 31 and second condenser lens 32 as shown in FIG. 1 and converted into approximately parallel light, and then pass through quarter-wave plate 30 and dichroic mirror 29.

On the other hand, the blue light reflected on reflection region 42 maintains its polarization property, i.e., is circularly-polarized light having a rotation reverse to that of the incident circularly-polarized light. The blue light is condensed by first condenser lens 31 and second condenser lens 32 as shown in FIG. 1 and converted into approximately parallel light. After that, the parallel light is converted into P-polarized light by quarter-wave plate 30. The light converted into P-polarized light is transmitted through dichroic mirror 29. Thus, the light that has passed through dichroic mirror 29 is synthesized to produce white light. Based on the wavelength conversion efficiency from excitation light to each fluorescent light, three segments are divided by an appropriate division ratio (division angle). This makes it possible to control the intensity ratio of green light, red light, and blue light, thereby obtaining white light with a desirable white balance.

To condense the fluorescent light from fluorescent plate 37 efficiently while keeping near fully-diffused light properties, two condenser lenses of non-spherical first condenser lens 31 and spherical second condenser lens 32 are used. The light with an incident angle of approximately ±70 degrees is condensed by the above two condenser lenses and converted into approximately parallel light.

Second condenser lens 32 has a diameter of 20 mm and is disposed apart from fluorescent plate 37 by a distance of approximately 1.5 mm. For this reason, the light intensity distribution on a plane side of second condenser lens 32 is a Gaussian distribution with a diameter of approximately 4 mm, and its light density becomes higher than that of other lighting devices, thereby heating up to high temperature.

Further, a temperature deference between a center portion and a peripheral portion of second condenser lens 32 is large. If used under a high temperature and large temperature difference conditions, a lens may cause birefringence due to thermal stress. This changes the light properties from circularly-polarized light to elliptical-polarized light. As a result, the polarization conversion efficiency is reduced to decrease an output of the blue light passing through dichroic mirror 29.

FIG. 4 shows a linear expansion coefficient of optical glass 102 type (crown glass, flint grass), which is a typical glass material usable for a lens material. FIG. 4 further shows linear expansion coefficients of three types of low thermal expansion glasses. As shown in FIG. 4, the linear expansion coefficient of optical glass 102 type is at least $60\times10^{-7}$. If an optical glass with such a linear expansion coefficient is used for the lens, the polarized light will be affected by heat very largely. Accordingly, it is necessary to select a glass material for a lens having a linear expansion coefficient less than this value.

For this reason, various materials usable for a lens are reviewed and a glass material for a lens having a linear expansion coefficient of 32.5×10-7 is obtained as a low thermal expansion glass material whose linear expansion coefficient is sufficiently smaller than $60\times10^{-7}$. As such a glass material for a lens having a linear expansion coefficient of 32.5×10-7, Pyrex (registered Trademark) or Tempax (registered Trademark) can be used.

It is conformed that the use of such a low thermal expansion glass material prevents the occurrence of birefringence even under a relatively high temperature condition and has little effect on the polarized light substantially.

The lens using Pyrex or Tempax costs relatively low. On the contrary, as shown in FIG. 4, synthetic quartz glass has a linear expansion coefficient of $5.0\times10^{-7}$ to $5.9\times10^{-7}$, which is less than those of Pyrex and Tempax. Therefore, the synthetic quartz glass has superior properties even under high temperature conditions as a low thermal expansion glass material, although it costs relatively high. Thus, it is more preferable to use the synthetic quartz glass for a lens.

Figure 5:
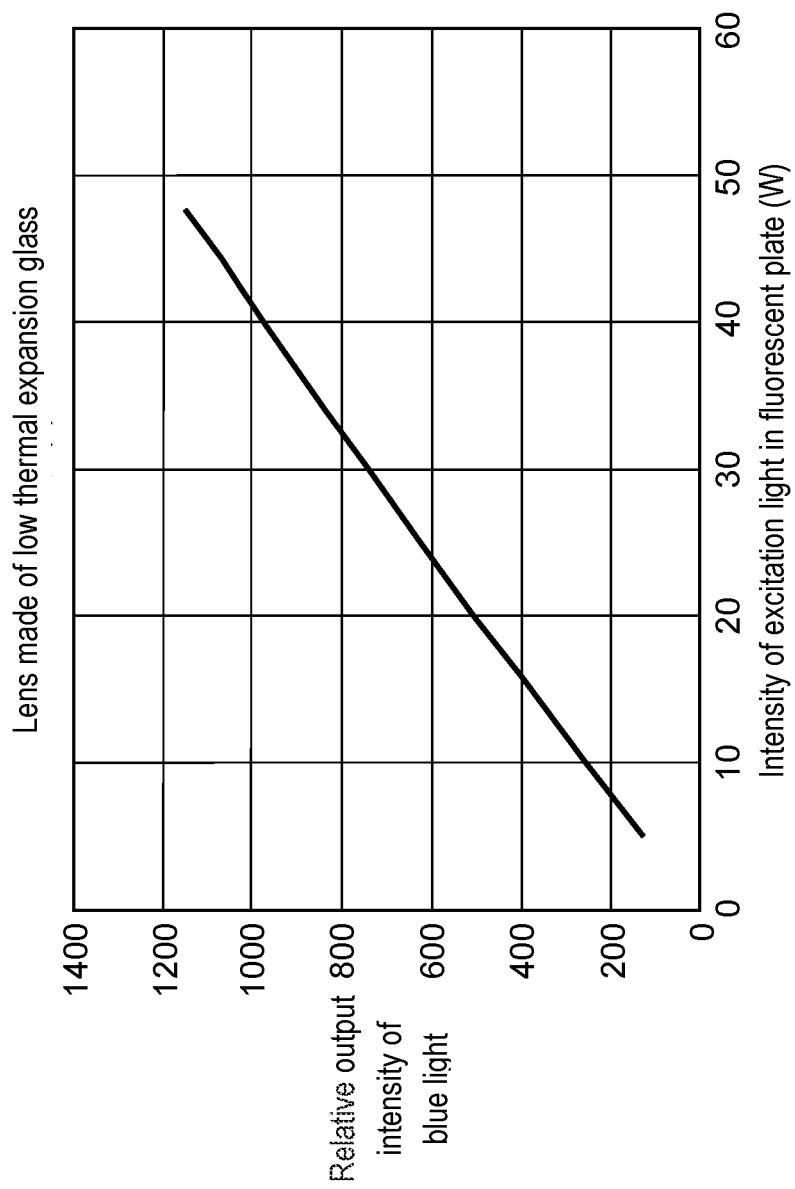
FIG. 5 is a diagram showing relative output intensity of blue light with respect to intensity of excitation light in a lens using a low thermal expansion material.

FIG. 5 shows relative output intensity of blue light with respect to intensity of excitation light in fluorescent plate 37 when a lens made of these low thermal expansion glasses is employed. As a glass material of second condenser lens 32, synthetic quartz glass, which is a low thermal expansion glass material, is employed. As shown in FIG. 5, the intensity of the blue light passing through dichroic mirror 29 increases proportionally with respect to the intensity of the excitation light entering fluorescent plate 37.

Figure 6:
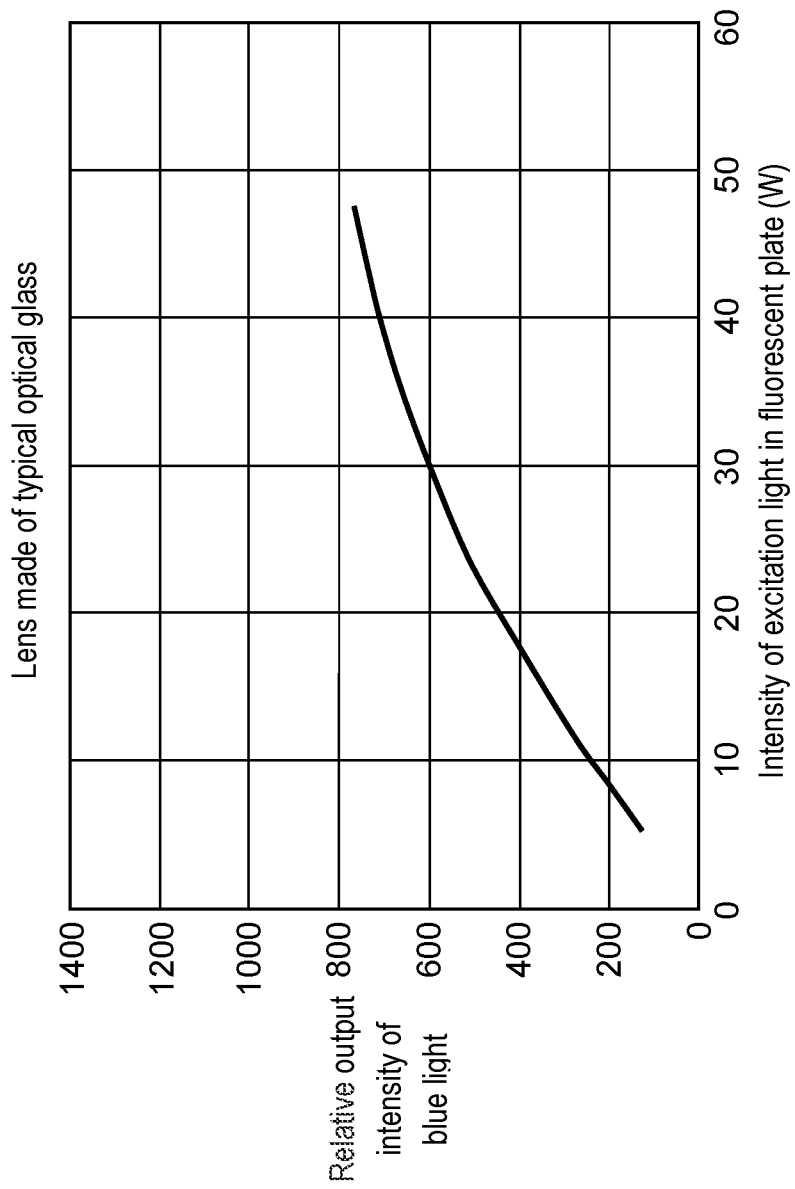
FIG. 6 is a diagram showing relative output intensity of blue light with respect to intensity of excitation light in the conventional lens.

FIG. 6 shows relative output intensity of blue light with respect to intensity of excitation light in fluorescent plate 37 when a lens made of typical optical glass is employed. As a glass material of second condenser lens 32, a lens with a linear expansion coefficient of $72\times10^{-7}$ is employed. As shown in FIG. 6, when the intensity of the excitation light entering fluorescent plate 37 increases, the conversion efficiency in a polarization direction is decreased because of the birefringence of second condenser lens 32. Thus, the output intensity of the blue light passing through dichroic mirror 29 is reduced.

According to FIG. 5 and FIG. 6, comparing second condenser lens 32 using a synthetic quartz glass of a low thermal expansion glass material and second condenser lens 32 using a typical optical glass material, the synthetic quartz glass has 1.14 times the output intensity of blue light when the intensity of excitation light is 20, and has 1.4 times the output intensity when the intensity of excitation light is 40.

By using the low thermal expansion glass material for second condenser lens 32, the output intensity of blue light is improved largely. If birefringence also occurs in first condenser lens 31, the low thermal expansion glass material may be used for first condenser lens 31. In this case, the output of blue light is more improved.

Fluorescent plate 37 shown in FIG. 3A is divided into three segments, but it may be divided into four segments, i.e., a red phosphor, a green phosphor, a yellow phosphor of Ce activated YAG base, and a reflection region on which no phosphor is applied. By using the yellow phosphor, white balance is more improved and bright white light is obtained.

Dichroic mirror 29 with an incident angle of 55 degrees is used to increase a wavelength separation width between P-polarized light and S-polarized light, but a dichroic mirror with an incident angle of 45 degrees may be used. Solid-state light source unit 23 is used as a single unit in FIG. 1, but a plurality of solid-state light source units may be synthesized by a mirror.

As mentioned above, light source apparatus 11 of the present embodiment includes at least second condenser lens 32 close to fluorescent plate 37, which uses a low thermal expansion glass material having a linear expansion coefficient of $32.5\times10^{-7}$ or less. If the condenser lens is used at high temperature, its birefringence will be eliminated and an output of blue light is improved. Thus, a light source apparatus with high brightness can be obtained.

Second Exemplary Embodiment

FIG. 7 is a schematic diagram of light source apparatus 12 showing a second embodiment of the present disclosure.

Solid-state light source unit 53 has 24 units (6×4) of semiconductor laser 50 and collimating lens 52 that are provided on heat dissipating plate 51 and arranged two-dimensionally at predetermined intervals in a square manner. To cool solid-state light source unit 53, heat sink 54 is provided. Semiconductor laser 50 emits blue light having a wavelength of 440 nm to 445 nm and outputs linearly polarized light. Semiconductor lasers 50 are disposed with respect to an incident surface of dichroic mirror 59 such that about 80 percent of the number of semiconductor lasers emit S-polarized light and about 20 percent of the number of semiconductor lasers emit P-polarized light. Dichroic mirror 59 reflects S-polarized light but transmits P-polarized light. Note that, FIG. 7 also illustrates a state of each light beam emitted from solid-state light source unit 53.

The light emitted from a plurality of semiconductor lasers 50 is condensed by the corresponding collimating lenses 52 respectively and converted into parallel light beams 55. A group of light beams 55 is more condensed by convex lens 56 and concave lens 57, and enters diffusion plate 58. Diffuser plate 58 is made of glass and its front surface is finely roughed to diffuse light. Supposed that a diffusion angle is defined by a half angular width at which the intensity of the diffused light decreases to 50% of the maximum intensity, the diffusion angle of the diffused light is as high as about 3 degrees. Thus, the diffused light maintains its polarization property. The light emitted from diffusion plate 58 enters dichroic mirror 59.

The light beam of S-polarized light entering dichroic mirror 59 is reflected on dichroic mirror 59. The light beam of S-polarized light reflected on dichroic mirror 59 is condensed by first condenser lens 60 and second condenser lens 61. The light beam is superimposed to spot light with a diameter of 1 mm to 2 mm, at which the light intensity is decreased to 13.5% of the peak intensity, and enters fluorescent plate 66. First condenser lens 60 and second condenser lens 61 constitute a fluorescent-light side condenser lens. Diffusion plate 58 diffuses light such that the spot light has a desirable diameter.

Figure 8A:
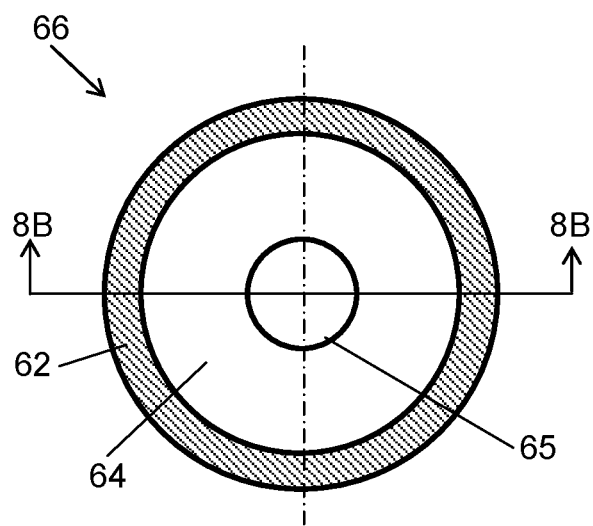
FIG. 8A is a schematic diagram of a fluorescent plate in the second exemplary embodiment and FIG. 8B is a sectional view taken along 8B-8B shown in FIG. 8A.
Figure 8B:
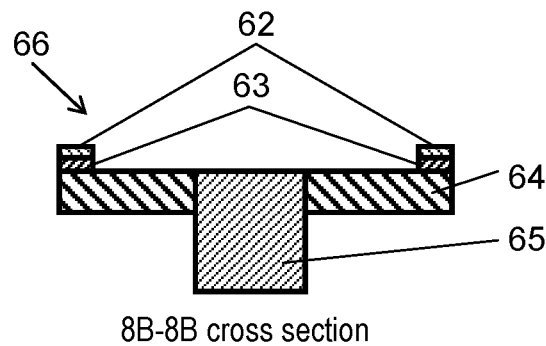

FIG. 8A is a schematic diagram of fluorescent plate 66, and FIG. 8B is a sectional view taken along 8B-8B shown in FIG. 8A. Fluorescent plate 66 is a circular substrate capable of controlling its rotation and includes reflection film 63, aluminum substrate 64 on which phosphor layer 62 is formed, and motor 65 provided in its center portion. Reflection film 63 of fluorescent plate 66 is a metal film for reflecting visible light. On phosphor layer 62, a yellow phosphor of Ce activated YAG base is formed. The yellow phosphor is excited by blue light to emit yellow light including a green and red components. A matrix crystal of the phosphor has a typical chemical organization of $Y_3Al_5O_{12}$. Phosphor layer 62 is formed into an annular shape. Phosphor layer 62 excited by the spot light emits the yellow light including a green and red light components. Aluminum substrate 64 of fluorescent plate 66, which is formed of aluminum having high thermal conductivity, is rotated to prevent temperature rise due to the excitation light in phosphor layer 62, thereby keeping fluorescence conversion efficiency stably.

The light entering phosphor layer 62 excites fluorescent light having a green and red components, and the resulting light is emitted from fluorescent plate 66. Further, the light directed to a reflection film 63 side is reflected on reflection film 63 and emitted from fluorescent plate 66. The green light and the red light emitted from fluorescent plate 66 are condensed by first condenser lens 60 and second condenser lens 61 and converted into approximately parallel light, and then transmitted through dichroic mirror 59. In this case, second condenser lens 61 is not necessary to use a low thermal expansion glass material because the green light and the red light emitted from fluorescent plate 66 do not have polarization properties.

On the other hand, the light beam of P-polarized light entering dichroic mirror 59 is transmitted through dichroic mirror 59. The blue light of P-polarized light passing through dichroic mirror 59 enters quarter-wave plate 67 serving as a phase difference plate. Quarter-wave plate 67 is a phase difference plate that causes a phase difference to be ¼ wave length in the vicinity of an emission wavelength of semiconductor laser 50. Quarter-wave plate 67 is made of crystal. The P-polarized incident light is converted into circularly-polarized light by quarter-wave plate 67.

The light that has passed through quarter-wave plate 67 is condensed by third condenser lens 68 and fourth condenser lens 69. Third condenser lens 68 and fourth condenser lens 69 have focal distances similar to those of first condenser lens 60 and second condenser lens 61, and form a converging spot in the vicinity of reflection plate 70. The converging spot has a diameter similar to that of the excitation light. Third condenser lens 68 and fourth condenser lens 69 constitute a reflection-plate side condenser lens.

Reflection plate 70 is made of glass and its surface on a condenser lens 69 side is finely roughed to diffuse light. On the other side surface, a reflection film such as a metal film or a dielectric film is formed. To reduce a speckle of laser and ensure uniform brightness, light reflection plate 70 is formed to have a diffuse reflection surface. By using the diffuse reflection surface, reflection plate 70 diffuses light to the extent that the blue light can maintain its polarization property. The light reflected on reflection plate 70, of which circularly-polarized light is inverted in phase, is condensed by third condenser lens 68 and fourth condenser lens 69 again.

To condense the light from reflection plate 70 efficiently, two condenser lenses of non-spherical third condenser lens 68 and spherical fourth condenser lens 69 are used. The light with an angle of approximately ±70 degrees is condensed by the above two condenser lenses and converted into parallel light.

Fourth condenser lens 69 has a diameter of 20 mm and is disposed apart from reflection plate 70 by a distance of approximately 1.5 mm. For this reason, the light intensity on a plane side (reflection plate 70 side) of fourth condenser lens 69 is a Gaussian distribution with a diameter of substantially 4 mm, and its light density is higher than that of other lighting devices, thereby heating up to high temperature. Further, a temperature deference between a center portion and a peripheral portion of fourth condenser lens 69 is large. If used under a high temperature and large temperature difference conditions, a lens may cause birefringence due to thermal stress. This changes the light properties from circularly-polarized light to elliptical-polarized light. As a result, polarization conversion efficiency is reduced to decrease an output of the blue light passing through dichroic mirror 59. Therefore, to avoid birefringence under a high temperature condition, fourth condenser lens 69 employs a lens made of a low thermal expansion glass material using synthetic quartz glass with a linear expansion coefficient of $5 \times 10^{-7}$. Note that, in the case where birefringence occurs in third condenser lens 68, the low thermal expansion glass material is also used for third condenser lens 68, thereby improving an output of blue light.

The light passing through third condenser lens 68 and fourth condenser lens 69 enters quarter-wave plate 67. The light that has entered quarter-wave plate 67 is converted from circularly-polarized light to S-polarized light, and blue light of the S-polarized light is reflected on dichroic mirror 59.

In this way, the fluorescent light from fluorescent plate 66 having a green and red components and the blue light condensed and uniformed efficiently while maintaining its polarization property are synthesized on dichroic mirror 59 and emitted as white light. The yellow light including a green and red components of fluorescent light and the blue light of semiconductor laser 50 can give a light-emitting property with a good white balance. Even if the emission spectral characteristics are divided into three primary colors in an optical system of projection display apparatus, desirable monochromatic light in a chromaticity coordinate can be obtained.

In FIG. 7, solid-state light source unit 53 is used as a single unit, but a plurality of solid-state light source units may be synthesized by a mirror. Dichroic mirror 59 is described to reflect 80% of blue light and transmit green light and red light, but may transmit 80% of blue light and reflect green light and red light.

As above, light source apparatus 12 of the present embodiment includes at least fourth condenser lens 69 close to reflection plate 70, which is a lens made of a low thermal expansion glass material having a linear expansion coefficient of $32.5 \times 10^{-7}$ or less. Thus, birefringence of the condenser lens due to a high temperature operation can be eliminated, thereby increasing an output of blue light and achieving a light source apparatus with high brightness.

Third Exemplary Embodiment

Figure 9:
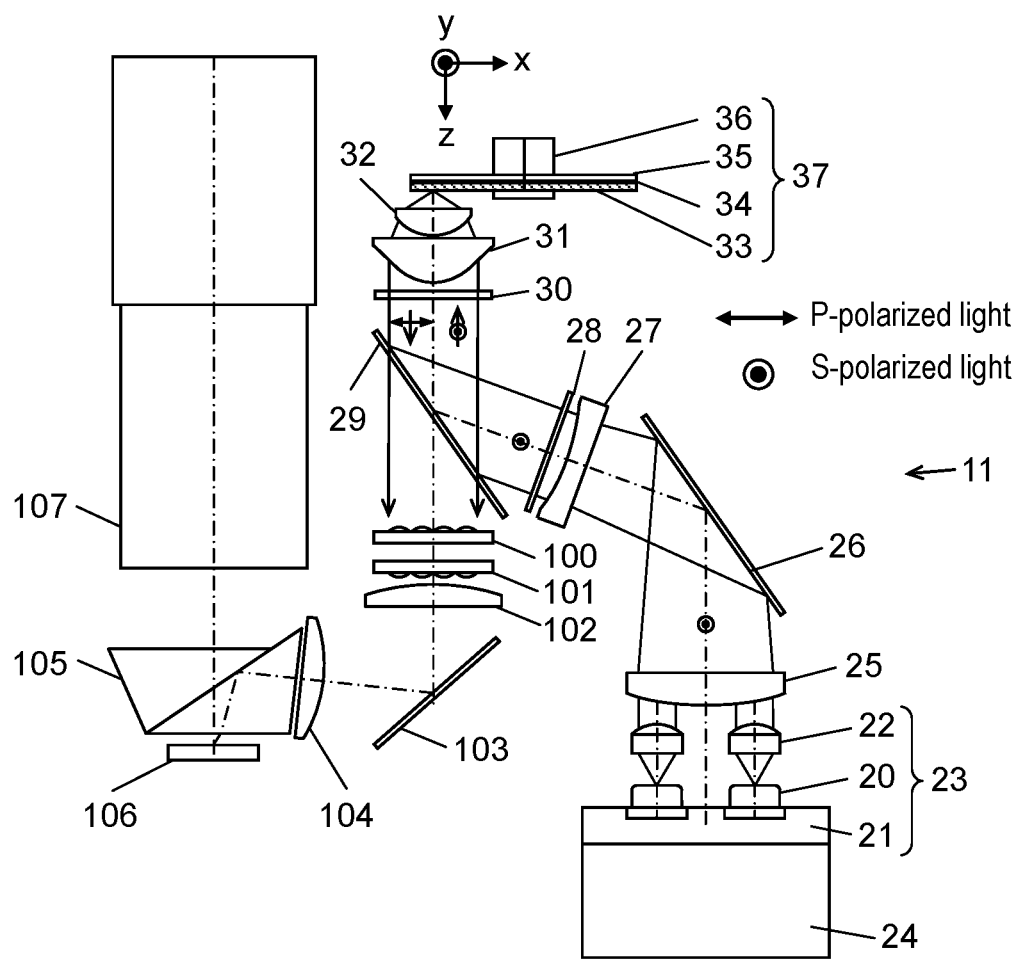
FIG. 9 is a schematic diagram of a light source apparatus in a third exemplary embodiment.

FIG. 9 shows a projection display apparatus of the present embodiment. As means for forming images, a single DMD is used. The DMD is used as an example of image forming elements.

Light source apparatus 11 has solid-state light source unit 23 including blue semiconductor laser 20, heat dissipating plate 21, and collimating lens 22. To cool solid-state light source unit 23, heat sink 24 is provided. Light source apparatus 11 further includes lens 25, lens 27, reflecting mirror 26, diffuser plate 28, dichroic mirror 29, quarter-wave plate 30, first condenser lens 31, second condenser lens 32, and fluorescent plate 37. Fluorescent plate 37 is constituted by aluminum substrate 35 on which phosphor layer 33 and reflection film 34 are formed, and motor 36. The above configurations are the same as those of light source apparatus 11 of the first exemplary embodiment in the present disclosure.

Light source apparatus 11 rotates fluorescent plate 37 to emit red light, green light, and blue light in time series. The light from light source apparatus 11 enters first lens array plate 100 constituted by a plurality of lens elements. The light beam that has entered first lens array plate 100 is divided into multiple light beams. The divided multiple light beams are condensed to a second lens array plate 101 constituted by a plurality of lens elements. The lens element of first lens array plate 100 has an opening shape similar to that of DMD 106. In the lens element of the second lens array plate 101, its focal distance is determined such that first lens array plate 100 and DMD 106 are substantially conjugated.

The light emitted from second lens array plate 101 enters superimposing lens 102. Superimposing lens 102 is a lens for superimposing the light emitted from each lens element of second lens array plate 101 and illuminating on DMD 106 with the resulting light. The light from superimposing lens 102 is reflected on reflection mirror 103 and enters field lens 104. Field lens 104 condenses the illumination light to projection lens 107 efficiently. The illumination light from field lens 104 enters total reflection prism 105. Total reflection prism 105 is constituted by two prisms. Between surfaces of the two prisms close to each other, a thin air layer is formed. The incident light is totally reflected on the air layer at a critical angle or more. The illumination light from field lens 104 is totally reflected thereon and illuminates DMD 106. At the same time, the projection light outputted from DMD 106 is transmitted therethrough.

Among the light entering DMD 106, only a light beam necessary to form images is deflected according to a video signal. The light beam is transmitted through total reflection prism 105 and then enters projection lens 107. Projection lens 107 magnifies image light modulated and formed by DMD 106 and projects it. In the present embodiment, a single DMD is used, i.e., light source apparatus 11 of first exemplary embodiment in the present disclosure is used, thereby making it possible to configure a small sized and bright projection display apparatus with a long life.

To ensure uniformity of projection images, two lens array plates are used as an integrated optical system, but a rod may be employed.

As above, the projection display apparatus of the present embodiment has a light source apparatus including a plurality of solid-state light sources, a dichroic mirror for reflecting blue light from the solid-state light sources, a phase difference plate, a fluorescent plate excited by light from the dichroic mirror to emit fluorescent light, and a condenser lens for condensing excitation light and the fluorescent light. The light source apparatus includes at least condenser lens close to fluorescent plate, which is a lens made of a low thermal expansion glass material having a linear expansion coefficient of $32.5\times10^{-7}$ or less. The present embodiment is a projection display apparatus constituted by this light source apparatus, the integrated illumination optical system using a lens array, and the single DMD, thereby achieving a small-sized and bright projection display with high uniformity of projection images.

Fourth Exemplary Embodiment

Figure 10:
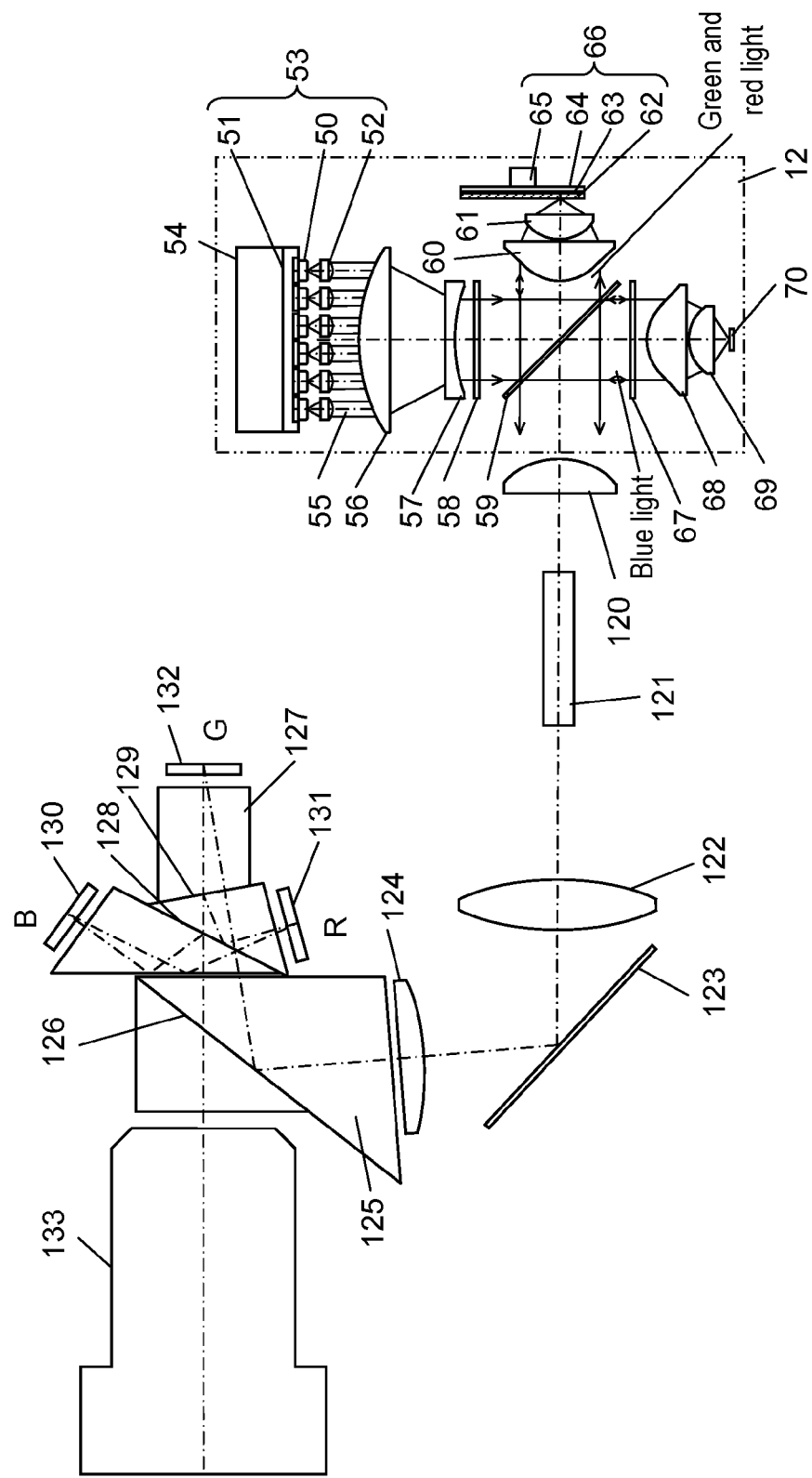
FIG. 10 is a schematic diagram of a light source apparatus in a fourth exemplary embodiment.

FIG. 10 shows a projection display apparatus of the present embodiment. As means for forming images, three DMDs are used.

Light source apparatus 12 has solid-state light source unit 53 including blue semiconductor laser 50, heat dissipating plate 51, and collimating lens 52. To cool solid-state light source unit 53, heat sink 54 is provided. Light from solid-state light source unit 53 travels to fluorescent plate 66 through lens 56, lens 57, diffusion plate 58, dichroic mirror 59, first condenser lens 60, and second condenser lens 61. Fluorescent plate 66 is constituted by aluminum substrate 64 on which reflection film 63 and phosphor layer 62 are formed, and motor 65. The light from solid-state light source unit is further transmitted through dichroic mirror 59. And then, the light is transmitted through quarter-wave plate 67, third condenser lens 68, and fourth condenser lens 69, and enters reflection plate 70. The above configuration is the same as that of light source apparatus 12 of second exemplary embodiment in the present disclosure.

White light from light source apparatus 12 enters lens 120 and is condensed to rod 121. The light entering rod 121 is reflected multiple times within the rod and the resulting light with a uniform light intensity distribution is emitted. The light emitted from rod 121 is condensed by relay lens 122 and reflected on reflection mirror 123. And then, the light is transmitted through field lens 124 and enters total reflection prism 125.

Total reflection prism 125 is constituted by two prisms. Between surfaces of the two prisms close to each other, thin air layer 126 is formed. Incident light is totally reflected on air layer 126 at a critical angle or more. The light from field lens 124 is reflected on a total reflection surface of total reflection prism 125 and enters color prism 127.

Color prism 127 is constituted by three prisms. On surfaces of the three prisms close to one another, blue-reflection dichroic mirror 128 and red-reflection dichroic mirror 129 are formed respectively. Blue-reflection dichroic mirror 128 and red-reflection dichroic mirror 129 of color prism 127 divide the light into blue light, red light, and green light, and the blue light, the red light, and the green light enter DMDs 130, 131, and 132, respectively.

DMDs 130, 131, and 132 tilt micro mirrors according to a video signal so that the light is reflected to enter projection lens 133 or to travel outside an effective area of projection lens 133. The light reflected by DMDs 130, 131, and 132 is transmitted through color prism 127 again. The blue light, the red light, and the green light are synthesized while traveling in color prism 127, and enter total reflection prism 125. The light that has entered total reflection prism 125 can pass through air layer 126 because its incident angle is less than or equal to the critical angle, and then enters projection lens 133.

In this way, the image light formed by DMDs 130, 131, and 132 is magnified and projected on a screen (not shown).

Light source apparatus 12, which is constituted by a plurality of solid-state light sources, emits white light with high brightness and a good white balance, thereby achieving a projection display apparatus with a long life and high brightness. Further, a DMD is used as means for forming images, thereby achieving a projection display apparatus whose light resistance and heat resistance are high as compared with another means for forming images using a liquid crystal. Furthermore, three DMDs are used, thereby achieving a bright projection image with good color reproduction and high precision.

As means for forming images, a DMD is used, but a transmission type of liquid crystal panel may be employed. Although the light resistance and heat resistance are inferior to those of a DMD, the transmission type of liquid crystal panel needs no total reflection prism and can use a compact prism with an incident angle of 45 degrees, thus achieving a small-sized projection display apparatus.

As above, the projection display apparatus of the present embodiment includes a plurality of solid-state light sources, a dichroic mirror for dividing light from the solid-state light sources and synthesizing blue light with green light and red light, a first and second condenser lenses, and a fluorescent plate excited by light from the dichroic mirror to emit fluorescent light and reflecting. Furthermore, by using the light source apparatus that includes a phase difference plate which the other light divided by the dichroic mirror enters, a third and fourth condenser lenses, and a reflection plate, a small-sized projection display apparatus with high brightness can be obtained.

INDUSTRIAL APPLICABILITY

The present disclosure relates to a projection display apparatus using means for forming images.

What is claimed is:
1. A light source apparatus comprising:
a solid-state light source:
a dichroic mirror for reflecting blue excitation light emitted from the solid-state light source;
a phase difference plate which the excitation light reflected on the dichroic mirror enters;
a fluorescent plate including a fluorescent region irradiated with the excitation light to emit fluorescent light and a reflection region on which the excitation light is reflected, the excitation light being reflected on the dichroic mirror and transmitted through the phase difference plate; and
a plurality of condenser lenses that are disposed between the phase difference plate and the fluorescent plate and condense the excitation light and the fluorescent light,
wherein at least the condenser lens closest to the fluorescent plate among the plurality of condenser lenses is a lens made of a glass material having a linear expansion coefficient of $32.5 \times 10^{-7}$ or less.
2. A light source apparatus, comprising:
a solid-state light source;
a dichroic mirror for dividing light from the solid-state light source and synthesizing blue light, green light, and red light;
a fluorescent-light side condenser lens for condensing one of the light divided by the dichroic mirror;
a fluorescent plate excited by the light supplied from the dichroic mirror and condensed by the fluorescent-light side condenser lens to emit fluorescent light;
a phase difference plate for converting the other of the light divided by the dichroic mirror into circularly-polarized light;
a reflection-plate side condenser lens for condensing the circularly-polarized light converted by the phase difference plate;
a reflection plate for reflecting back the light from the reflection-plate side condenser lens,
wherein the reflection-plate side condenser lens close to the reflection plate is a lens made of a glass material having a linear expansion coefficient of $32.5 \times 10^{-7}$ or less.
3. The light source apparatus according to claim 1, wherein
the glass material is synthetic quartz glass.
4. The light source apparatus according to claim 2, wherein
the glass material is synthetic quartz glass.
5. The light source apparatus according to claim 1, wherein
the glass material is a Pyrex (Registered Trademark) material or a Tempax (Registered Trademark) material.
6. The light source apparatus according to claim 2, wherein
the glass material is a Pyrex (Registered Trademark) material or a Tempax (Registered Trademark) material.
7. The light source apparatus according to claim 1, wherein
the dichroic mirror has an incident angle of 55 degrees.
8. The light source apparatus according to claim 2, wherein
the dichroic mirror has an incident angle of 55 degrees.
9. The light source apparatus according to claim 1, wherein
the solid-state light source is a blue semiconductor laser.
10. The light source apparatus according to claim 2, wherein
the solid-state light source is a blue semiconductor laser.
11. The light source apparatus according to claim 1, wherein
the solid-state light source emits linearly polarized light.
12. The light source apparatus according to claim 2, wherein
the solid-state light source emits linearly polarized light.
13. The light source apparatus according to claim 1, wherein
the phase difference plate is a quarter-wave plate.
14. The light source apparatus according to claim 2, wherein
the phase difference plate is a quarter-wave plate.
15. The light source apparatus according to claim 1, wherein
the fluorescent plate is rotated controllably.
16. The light source apparatus according to claim 2, wherein
the fluorescent plate is rotated controllably.
17. A projection display apparatus comprising:
the light source apparatus according to claim 1;
an illumination optical system for condensing light from the light source apparatus;
an image forming element for forming images from the light condensed by the illumination optical system according to a video signal; and
a projection lens for projecting the images formed by the image forming element.
18. A projection display apparatus comprising:
the light source apparatus according to claim 2;

an illumination optical system for condensing light from the light source apparatus;

an image forming element for forming images from the light condensed by the illumination optical system according to a video signal; and a projection lens for projecting the images formed by the image forming element.

19. The projection display apparatus according to claim 17, wherein the image forming element is a digital micro mirror device (DMD).

20. The projection display apparatus according to claim 18, wherein the image forming element is a digital micro mirror device (DMD).

* * * * *